358-69. OR 2,899,490 SR

SEARCH ROOM

T 632
X 6501

TELEVISION RECEIVING APPARATUS

Filed April 18, 1955 2 Sheets-Sheet 1

Inventors
William R. Cheetham
William G. Parr
By
Holcombe, Wetherill & Brisebois
Attorneys

TELEVISION RECEIVING APPARATUS

Inventors
William R. Cheetham
William G. Parr
By
Holcombe, Wetherill & Brisebois
Attorneys United States Patent Office 2,899,490
Patented Aug. 11, 1959

2,899,490

TELEVISION RECEIVING APPARATUS

William Roger Cheetham and William Geoffrey Parr, Cambridge, England, assignors to Pye Limited, Cambridge, England, a British company Application April 18, 1955, Serial No. 501,956

Claims priority, application Great Britain April 21, 1954

2 Claims. (Cl. 178—5.4)

The present invention relates to television receiving apparatus, particularly apparatus for receiving colour television signals and reconstituting them into a colour picture for viewing.

More particularly the invention is concerned with apparatus for receiving colour television signals, from which a plurality of simultaneous signals, each representing a particular colour component of a scene can be obtained. However, it is to be understood that the present invention is not necessarily limited to the reception of signals of the above type.

At the present time the domestic television service is purely in black and white and owing to the fact that large numbers of television receivers are in use, it has been a recognized requirement that any colour television system should be fully compatible with the existing black and white system. This means that the transmitted colour television signal should be receivable on the ordinary black and white receiver without substantial loss of quality and therefore it would be advantageous in a complete system to provide a receiver which is capable of receiving not only the colour television signals but also the conventional black and white signals, with no loss of resolution on black and white, at will. The present invention achieves, or substantially achieves, this object.

According to the present invention there is provided colour television receiving apparatus adapted to receive colour television signals having colour information components, in which the received signal is caused to modulate an electron beam that is arranged to be deflected to form a raster on a suitable surface, such as a fluorescent screen, and in which a multiple filter is arranged between the surface and the viewer in such a manner that the picture built up on the surface by the raster is viewed through said filter, the picture being preferably in focus at the filter, said filter comprising a plurality of sets of coloured areas, each set comprising a group of filter elements and some or all of the sets having a reference element with different transmission characteristics from the other elements in the set, a pick-up device being arranged in relation to said filter so as to receive energy transmitted through said filter and being adapted to produce therefrom an output waveform incorporating reference components due to the said filter reference elements of different transmission characteristics, which reference components are formed into separate gating waveforms suitably processed for application respectively to a plurality of channels, preferably one for each different kind of colour component in the received colour television signal, whereby said channels are caused to pass the different kinds of colour components in predetermined sequence to a modulating means for the said scanning electron beam so that when the scanning beam impinges on said surface it is in correct relation to the filter element of the correct kind for the colour component modulation that the scanning beam bears at that instant.

An optical viewing system may be interposed between the filter and the viewer and in this event, the picture and the filter are arranged to be in the same, or approximately the same, focal plane.

Conveniently the colour television signal is reconstituted on the screen of a cathode ray tube which is scanned by an electron beam, the routed colour component signals being applied to a modulating electrode of the tube in a predetermined sequence, and the multiple filter comprises a filter plate which can be readily applied to or removed from the external face of said screen in any suitable manner. A simple form of suitable pick-up device comprises a photo-electric cell which may be either of a panchromatic variety or one which is sensitive to any predetermined wavelength or range of wavelengths of radiation.

The multiple filter itself may consist of alternate elemental areas coloured red, green and blue, the areas, for example, conveniently taking the form of lines or stripes. The aforementioned reference elements with different transmission characteristics from all other filter elements may, for example, be either opaque or colourless and one such additional element is preferably provided in each set of coloured elements.

Alternatively, the multiple filter need not incorporate such additional separate reference elements, as previously mentioned, and the reference component may be obtained, for example, by employing, for one of the elements of each set, an element having a different kind of transmission characteristic in addition to its particular colour transmission capability. For example, it may be arranged that one of the coloured elements may transmit ultra-violet light whilst the other elements of the set reject ultra-violet light.

The light output from the fluorescent screen must contain colour components corresponding to the different individual colours of the filter elements used to reconstitute the colour picture, and preferably the light output decay time (as understood in the art) of the fluorescent screen should be fast. This will ensure a high instantaneous light output compared with the average light level over a period of time due to the "after-glow" nature of the energized fluorescent screen.

In one arrangement, a fluorescent screen having a component of output radiation of a different wavelength from that of any of the required colour components necessary for reconstituting the colour picture is used. This additional radiation is in the ultra-violet region of the light spectrum and is such that when the energy of the modulated scanning beam is reduced to zero, a very rapid decay of this radiated light takes place. In this case, the nature of the "after-glow" of the fluorescent components which radiate light of the necessary spectrum range to reconstitute the coloured picture may be such that the "peak instantaneous light output" to "average," over a particular time interval, is considerably less than the similar ratio for the fluorescent component which radiates ultra-violet light, considered for the same time interval.

In order that the invention may be more readily understood, reference will now be made to the accompanying drawings which show diagrammatic and schematic arrangements of two embodiments thereof by way of example and in which.

Figures 1, 2, 3, 3A, 4, 4A, 5, 6:
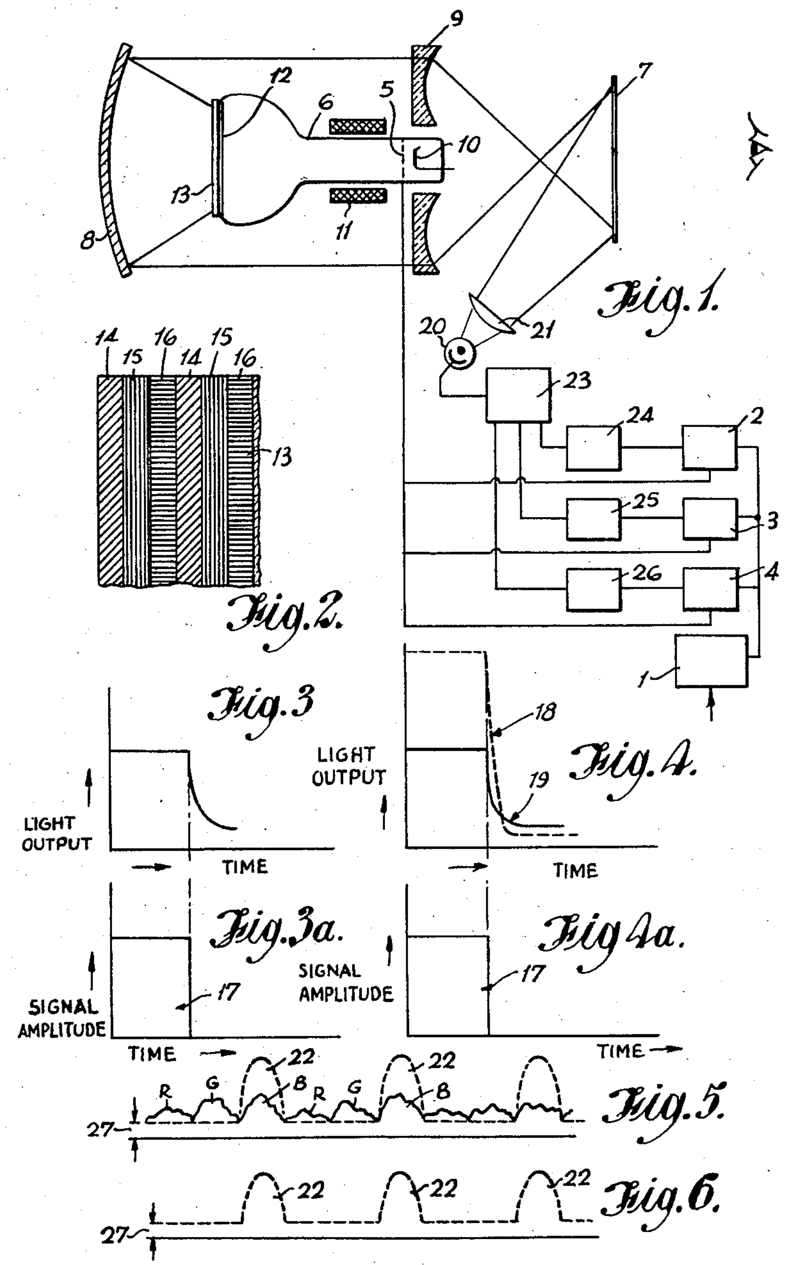
Fig. 1 shows an arrangement of receiving apparatus according to a first embodiment.
Fig. 2 shows part of a filter structure for use with the arrangement of Fig. 1.

Figs. 3 and 3*a* show desirable light output decay time curves for a fluorescent screen used in this arrangement.

Figs. 4 and 4*a* show curves depicting the desirable rapid decay of the ultra-violet light component of output radiation of the fluorescent screen compared with the decay of the ordinary colour components, when the modulation amplitude is reduced to zero.

Fig. 5 shows a portion of the waveform of the light passed to the photo-cell arrangement.

Fig. 6 shows the nature of the reference component output derived from the photo-cell arrangement.

Figure 7:
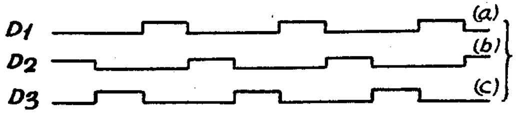

Fig. 7 shows the nature of the delayed gating components produced from the reference components shown in Fig. 6.

Figures 8, 9:
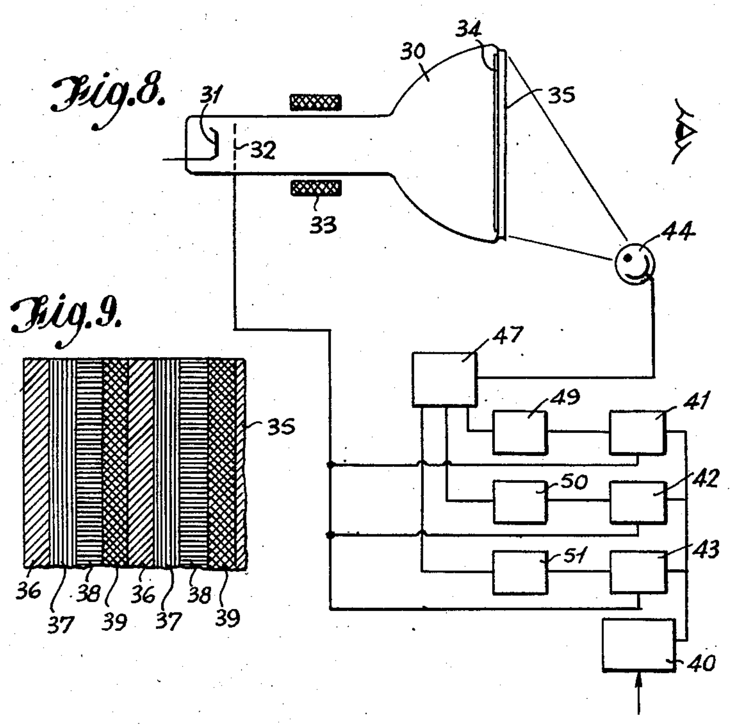

Fig. 8 shows an arrangement of receiving apparatus according to a second embodiment.

Fig. 9 shows a portion of a filter structure used in the embodiment of Fig. 8.

Figure 10:
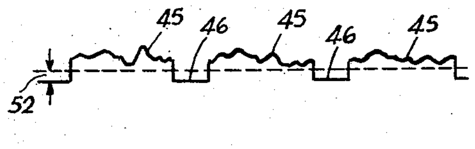

Fig. 10 shows a portion of the photo-cell output waveform of this second embodiment.

Figure 11:
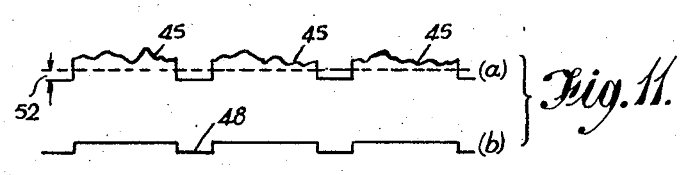
Figure 12:
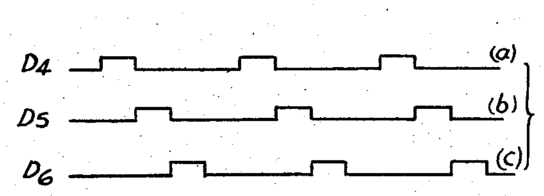

Fig. 11 shows the nature of the separated components of the photo-cell output of Fig. 10, and Fig. 12 shows the nature of the delayed gating components produced from the separated reference components of Fig. 11 (*a*).

Referring first to the embodiment illustrated in Figs. 1 to 7, the incoming signal is separated into three colour channels as shown in Fig. 1, by any convenient separating means diagrammatically shown at 1. This separating means is not shown in detail since its construction may follow the principles laid down in the art. The individual colour component signals are then applied to separate video amplifiers, shown schematically at 2, 3 and 4, which may respectively be "red," "green" and "blue" amplifiers. The amplifiers 2, 3 and 4 are biassed so that they are normally cut off until they receive a respective gating signal when the appropriate amplifier is caused to pass a signal to the modulating electrode 5 of a cathode ray tube 6.

The cathode ray tube 6 is shown as part of a projection receiver or monitor, the reconstituted colour picture being viewed on a screen 7. Many different arrangements for projection viewing exist and one suitable arrangement for use in the invention is a system of reflective optics of which the Schmidt system is an example. As shown schematically in Fig. 1, the Schmidt-type reflective optics comprise a spherical mirror 8 and a transparent apertured correction plate 9. The cathode ray tube 6 is provided in the usual way with an electron gun schematically shown at 10 and with scanning coils as at 11.

Externally of the tube and close to the fluorescent screen 12 thereof, there is arranged a multiple filter structure 13, the nature of which is shown in the portion thereof depicted in Fig. 2.

The filter 13 comprises a plurality of sets of coloured areas, each set comprising a group of filter elements respectively coloured red, green and blue as shown at 14, 15, 16.

The light output from the fluorescent screen 12 contains colour components corresponding to the different individual colours of the filter elements of the filter 13 and the light output decay time of the screen 12 is fast, as is diagrammatically illustrated in Fig. 3, which is a curve of the light output of the screen with respect to time. When the modulating waveform drops to zero, as indicated by the dotted lines in Fig. 3, the light output decays rapidly away. Fig. 3*a* shows a signal amplitude to time curve of the modulating waveform 17 for the same time interval as Fig. 3.

The fluorescent screen 12 also has a component of output radiation of a different wavelength from that of any of the required colour components, which additional radiation is in the ultra-violet region of the light spectrum and is such that when the energy of the modulated scanning beam is reduced to zero a very rapid decay of this radiated light output takes place. This is shown in the curves of Figs. 4 and 4*a* in which Fig. 4 shows the relatively rapid rate of decay of the ultra-violet component 18 compared with the composite red, green and blue components 19, Fig. 4 being plotted as light output versus time and in which Fig. 4*a* shows a modulating waveform at 19 dropping rapidly to zero for the same time interval as in Fig. 4, and represents signal amplitude versus time.

In this case the nature of the after-glow of the fluorescent components which radiate light of the necessary spectrum range to reconstitute the colour picture are such that the "peak instantaneous light output" to "average" over a particular time interval is considerably less than the similar ratio of the fluorescent component which radiates ultra-violet light, considered for the same time interval.

In order to obtain this ultra-violet light component, one of the coloured filter elements is additionally arranged to transmit ultra-violet light and this element is preferably the blue element so that therefore the sequence of filter elements in a set could be red transmit and ultra-violet reject at 14, green transmit and ultra-violet reject at 15, and blue transmit and ultra-violet transmit at 16.

Located behind the viewing side of the screen 7 so as to pick-up scattered reflected light therefrom, there is provided a photo-electric cell 20, the light being condensed on to the cell by means of a condenser lens 21. By using the aforementioned fluorescent screen and the multiple filter characteristics, it is ensured that a relatively large signal is generated by the photo-electric cell 20 when the instantaneous light output from the fluorescent screen 12 due to excitation by the scanning beam is originated from an area of the screen immediately behind a blue filter element compared with the signal generated by the photo-electric cell arrangement due to the residual after-glow of areas of screen previously excited by the beam. These said relatively large signals due to ultra-violet light passing through the blue filter element are used as the reference components hereinabove referred to.

The photo-electric cell 20 is arranged so as to receive light from the whole of the fluorescent screen surface and there is no need for this to be in the form of a focussed image. It is preferable to arrange that any light-transmitting medium or reflecting surface between the photo-electric cell and fluorescent screen absorbs a minimum of the ultra-violet radiation. It may be additionally advantageous to interpose a light filter between the fluorescent screen and the photo-electric cell which transmits only the desired range of the ultra-violet light in the light spectrum when practising the invention with this particular arrangement, i.e. when using ultra-violet light.

The nature of the waveform applied to the photo-electric cell is shown in Fig. 5 in which the red, green and blue components are denoted by R, G and B respectively and in which the component due to ultra-violet light is shown at 22. The nature of the resultant output from the photo-electric cell 20 is shown in Fig. 6 and this output is passed to a processing unit, schematically shown at 23 in Fig. 1, the output from which may be in the form of a series of differentiated pulses which are subsequently processed in the processing units 24, 25, 26 to form suitable individual series of gating pulses for the respective colour component amplifier channels 2, 3 and 4. That is to say, each set of gating pulses corresponding to a set of filter elements may be accurately initiated in time and individually each pulse or train of pulses may be accurately delayed in the processing networks 24, 25, 26 so as to cause each colour component type amplifier to pass its respective colour signal. The nature of the gating pulses is shown in Fig. 7, (*a*), (*b*) and (*c*) in which D1, D2, D3 show respectively the delayed trains of pulses passed to the video amplifiers 2, 3 and 4.

In order that reference components are generated at all times during the desired active scanning time of the electron beam, the beam energy must not be allowed to fall below a predetermined minimum during this active scanning time. This predetermined minimum output is shown at 27 on Fig. 5. It is preferable to ensure that during the beam retrace period or flyback period as it is sometimes referred to, the beam is adequately suppressed and this may be accomplished in any way found desirable. Many well-known methods of achieving this are known in the art and therefore need not be referred to in detail here.

Although the reference component is generated by use of the blue filter element it will be appreciated that either the red or green filter elements may be used for this purpose. However, if it is found desirable, the reference components may be generated using filter elements of a type different from those necessary to reconstitute the colour picture, for example, opaque or transparent or neutral density filter elements.

Moreover, although with a system of reconstituting the colour picture using a strip filter arrangement, it is preferable to use a projection type receiver, direct viewing may also be employed if desired and an arrangement using opaque filter elements to form the reference components and direct viewing is shown in Figs. 8 to 12.

In these Figures 8 to 12, a cathode ray receiving tube is shown at 30 and is provided with the usual electron gun schematically shown at 31, modulating electrode shown at 32 and scanning coils at 33. Externally of the tube and as close to the fluorescent screen 34 as possible, there is provided a multiple filter structure 35, the nature of which is shown in more detail in Fig. 9 which shows a portion thereof. This filter is similar to that shown in Fig. 2 except that it comprises red, green, blue and opaque elements respectively at 36, 37, 38, 39.

Similarly to the arrangement shown in Figs. 1 to 7, the incoming signal is separated into three colour channels, "red," "green" and "blue" by any convenient separating means 40, the individual colour component signals being applied to separate video amplifiers 41, 42, 43. These amplifiers, similarly to the amplifiers 2, 3 and 4 in Fig. 1, are biased so that they are normally cut off until they receive a respective gating signal when the appropriate amplifier is caused to pass a signal to the modulating electrode 32 of the tube 30.

Located so as to pick up light transmitted through the filter 35 is a photo-electric cell 44 which produces an output the nature of which is shown in Fig. 10, in which the composite coloured components are shown at 45, together with the reference components due to the opaque areas of the filter at 46.

Fig. 11 (*a*) and (*b*) shows the nature of the components as separated by the separating unit 47 which is used to provide the reference components 48 shown in Fig. 11 (*b*). These reference components are fed to delay networks 49, 50, 51 and suitably processed as referred to in the arrangement of Fig. 1 to provide separate time spaced gating pulses shown in Fig 12 (*a*), (*b*) and (*c*) at D4, D5, D6 respectively for application to the amplifier channels 41, 42, 43 to effect gating thereof consequently to effect application of colour component modulation signals to the modulating electrode 32 of the cathode ray tube 30 so that when the beam bears modulation due to any one colour component, the scanning spot will impinge on the fluorescent screen of the tube behind a filter element of the appropriate colour.

In order that the reference component of the output signal from the photo-cell arrangement can be distinguished from the remainder, it is necessary to ensure that during the active portions of the scan the intensity of the radiation from the screen due to the scanning beam never falls below a predetermined minimum, which minimum is indicated in Figs. 10 and 11 at 52.

The invention thus permits the reconstitution of a colour signal in a time sequential manner, the original colour signal or signals being simultaneous in form.

It will be understood that the invention has been described only by way of example and that various modifications could be made to the specific details set forth without in any way departing from its scope. As an example, the three colours for a three-colour television system as herein referred to need not be red, green and blue but any range of selected colours found suitable. Also, in the embodiment of Fig. 8, the light from the filter 35 could be condensed by a condenser lens, similarly to the arrangement of Fig. 1. Also, instead of using opaque filter elements to form the reference components, it will be understood that transparent or neutral density filter elements may be used for this purpose. Other modifications will also be apparent to those skilled in the art.

We claim:

1. Colour television receiving apparatus adapted to receive colour television signals having colour information components, comprising a fluorescent screen, means for modulating an electron beam, means for deflecting said beam to form a raster on said fluorescent screen, a multiple filter separate from but located on said screen so that a picture built up on said screen by said raster may be viewed through said filter, the picture being preferably in focus at said filter, said filter comprising a plurality of sets of coloured areas, each set comprising a group of filter elements and at least some of said sets having at least one reference element arranged to pass a totally different band of frequencies from any other one element in the set and lying outside the total range of frequencies passed by all the other elements in the set, a pick-up device arranged in relation to said filter for receiving energy transmitted through said filter, means for causing said pick-up device to produce from said energy an output waveform incorporating reference components due to the said filter reference elements of different transmission characteristics, means for forming said reference components into separate gating waveforms, means for processing said gating waveforms, a plurality of channels, one for each different kind of colour component in the received colour television signal, a modulating means for the said scanning electron beam, and means for feeding said processed waveforms respectively to said channels whereby said channels are caused to pass the different kinds of colour components in predetermined sequence to said modulating means for said scanning electron beam so that when the scanning beam impinges on said screen it is in correct relation to the filter element of the correct kind for the colour component modulation that the scanning beam bears at that instant.

2. Colour television receiving apparatus comprising a cathode ray tube, a multiple filter structure applied to the external face of said tube in front of the fluorescent screen thereof, said filter comprising a plurality of sets of coloured areas, each set comprising a group of filter elements, at least some of said sets having at least one reference element arranged to pass a totally different band of frequencies from any other one face in the set and lying outside the total range of frequencies passed by all the other elements in the set, a photo-cell pick-up device arranged externally of said tube for the reception of energy transmitted through said filter, means for producing from said transmitted energy an output waveform incorporating reference components due to the said filter reference elements of different transmission characteristics, means for forming from said reference components separate gating waveforms, means for processing said gating waveforms, a plurality of channels, one for each different kind of colour component in the received colour television signal, a modulating means for said cathode ray tube, and means for feeding said processed waveforms respectively to said channels whereby said channels are caused to pass the different kinds of colour components in predetermined sequence to said modulating means for said scanning electron beam so that when the scanning beam impinges on said screen it is in correct relation to the filter element of the correct kind for the colour component modulation that the scanning beam bears at that instant.

References Cited in the file of this patent

UNITED STATES PATENTS

| | | |
|---|---|---|
| 2,635,141 | Bedford | Apr. 4, 1953 |
| 2,644,855 | Bradley | July 7, 1953 |
| 2,674,651 | Creamer | Apr. 6, 1954 |
| 2,689,269 | Bradley | Sept. 14, 1954 |
| 2,727,090 | Okolicsanyi | Dec. 13, 1955 |
| 2,769,855 | Boothroyd | Nov. 6, 1956 |